United States Patent [19]

Aiello et al.

[11] Patent Number: 5,001,324

[45] Date of Patent: Mar. 19, 1991

[54] PRECISION JOINT TRACKING LASER WELDING SYSTEM

[75] Inventors: Louis L. Aiello, Castle Hayne; James A. Mees, Wilmington, both of N.C.

[73] Assignee: General Electric Company

[21] Appl. No.: 407,076

[22] Filed: Sep. 14, 1989

[51] Int. Cl.$^5$ ............................................. B23K 26/00
[52] U.S. Cl. ............................ 219/121.63; 219/121.78; 219/121.8; 219/121.81; 219/121.83
[58] Field of Search ..................... 219/121.63, 121.64, 219/121.78, 121.8, 121.81, 121.83, 121.79, 124.34

[56] References Cited

U.S. PATENT DOCUMENTS

| | | | |
|---|---|---|---|
| 4,410,787 | 10/1983 | Kremers et al. | 219/124.34 |
| 4,412,121 | 10/1983 | Kremers et al. | 219/124.34 |
| 4,700,045 | 10/1987 | Merry et al. | 219/121.8 X |
| 4,764,655 | 8/1988 | Ortiz, Jr. et al. | 219/121.64 X |
| 4,812,614 | 3/1989 | Wang et al. | 219/124.34 |

Primary Examiner—C. L. Albritton

[57] ABSTRACT

A laser profiler is mounted to the focusing head for a laser welding beam to generate profile data for successive transverse viewing planes of an elongated joint prior to their presentations to the welding beam. The profile data is computer processed in accordance with a joint extraction algorithm using parameters defined in a tracking schedule characterizing the geometry of the joint to calculate the location of the joint centerline. The centerline location data is computer processed in accordance with a tracking algorithm to generate signals for activating a positioning head to adjust the position of the welding beam focal point and thus to track the moving joint as seam welding is effected.

9 Claims, 4 Drawing Sheets

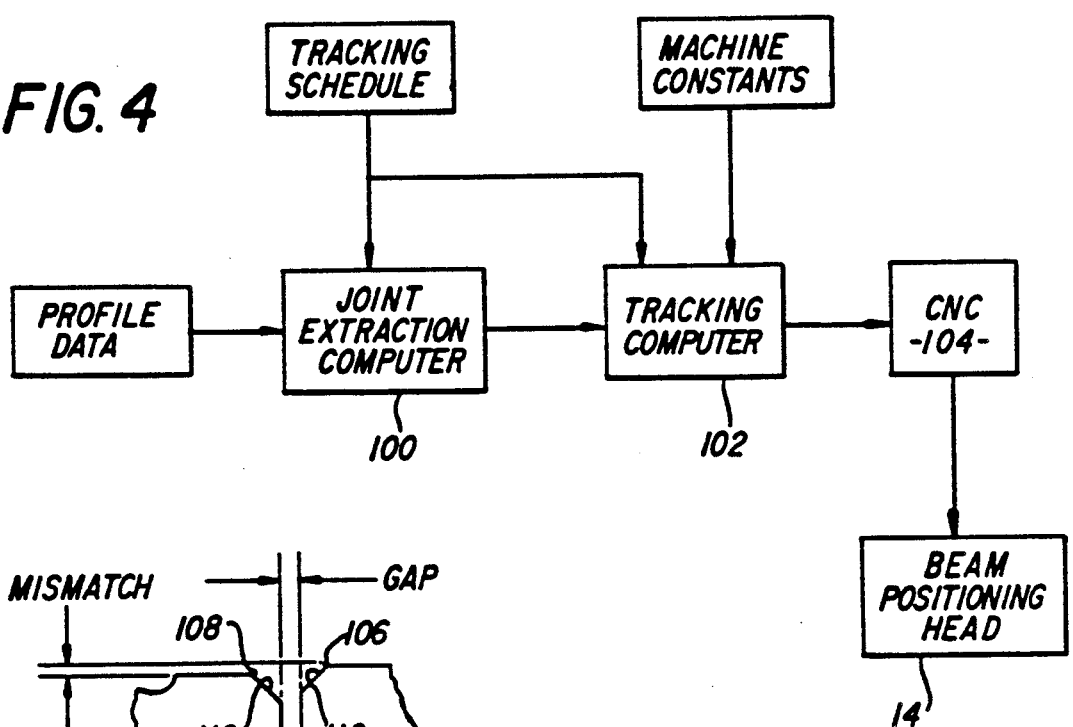
FIG. 4
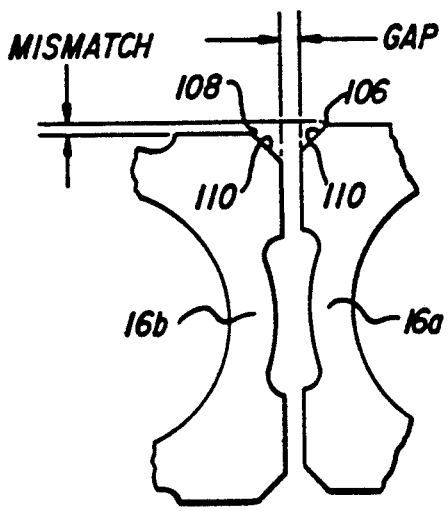
FIG. 5
FIG. 6A
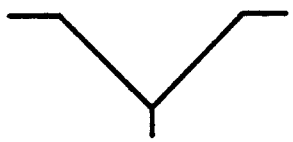
FIG. 6B
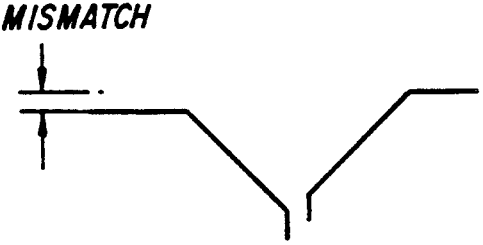
FIG. 6C
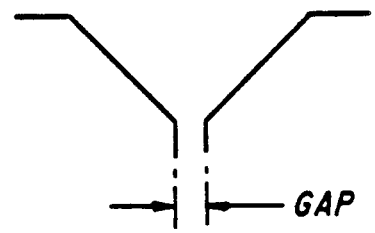

PRECISION JOINT TRACKING LASER WELDING SYSTEM

The present invention relates to laser welding systems and particularly to a laser system for effecting a continuous seam weld along an elongated joint between juxtaposed elements.

BACKGROUND OF THE INVENTION

There are numerous applications calling for the joining of elongated elements juxtaposed along a coextensive joint or seam. For most metallic elements, the obvious approach is to join them with a seam weld. There are of course numerous types of welding instrumentalities that may be utilized to effect seam welds on a production line basis. Such as TIG, MIG, electron beam, laser welding, etc. Of these, laser welding offets the advantage of being capable of concentrating the Welding energy to extremely high intensities onto very small areas with great precision.

As a result, laser welds can be effected with substantially less heat input to the elements as compared to TIG or MIG welds.. Residual tensile stresses are dramatically reduced, as are adverse metallurgical changes in the elements in the heat affected zones of the elements adjacent the weldment.

Whichever welding technique is utilized, seam welding an elongated joint on an automated production line basis requires a tracking sensor to locate and follow the joint and then to positional control the application of welding energy during relative motion of the joint and the welding instrumentality. In the case of laser welding, the tracking sensor must continuously resolve the joint location with high precision, as the laser beam impinging on the joint may be focused down to a diameter as small as 10 mils or less. Tracking sensors may be of the contacting or non-contacting type. Those using a contacting stylus are capable of following a joint with a reasonable degree of resolution to control the application of a laser welding beam thereto. However, the stylus tends to wear over time, and reliability suffers as a result. Non-contacting sensors utilizing electrical, optical, pneumatic or acoustic probing techniques are potential candidates.

A particularly attractive non-contacting tracking sensor approach is the one disclosed in commonly assigned Penney et al., U.S. Pat. No. 4,645,917, entitled "Swept Aperture Flying Spot Scanner". As disclosed therein, a laser beam, transmitted through a coherent optic fiber bundle, is projected at a suitable angle, e.g. 30°, to normal, to a focused spot substantially at the surface to be profiled. The laser spot is swept over the surface in X and Y raster scan fashion. The diffuse, reflected light from the scanned laser spot observed along a line of sight normal to the surface is conveyed through a second coherent fiber optic bundle to a descanning device, such as a mirror oscillating in synchronism with the movement of the laser spot in one of the sweep directions, e.g., Y direction. This produces a narrow scanning aperture through which the diffuse, reflected light passes to a suitable optical sensor, such as a photomultiplier tube. By noting at what point in the interval of each X-direction sweep the laser spot is observed by the optical sensor, the elevation of the observed surface as a function of where the laser spot is in the Y-direction sweep can be determined by optical triangulation. From this can be obtained a precise profile of the surface in the field of view defined by the scanning aperture, which lies in a viewing plane normal to the surface. That is, the optical sensor response can be processed to provide, in essence, a sectional view indicating surface profile. An application calling for effecting a plurality of precise, elongated seam welds, to which the present invention has particular applicability, is the manufacture of control rods for nuclear reactors. In the commonly assigned, copending application of Aiello et al., Ser. No. 250,631, filed Sept. 29, 1988, entitled "Control Rod Absorber Section Fabrication by Square Tube Configuration and Dual Laser Welding Process", there is disclosed apparatus for manufacturing control rods of cruciform cross section. Each control rod is comprised of a multiplicity of elongated tubes, each having a basically square exterior shape and a central bore for accepting neutron absorbing or so-called "poison" material, such as boron carbide. The individual tubes, with the poison sealed therein, are clamped together in a fixture with as many as fourteen tubes in each of the four wings of the cruciform. The corners of the tubes are chamfered, such that when juxtaposed along their lengths of fourteen feet more or less, a multiplicity of parallel V-shaped grooves or seams between adjacent tubes are presented. The fixtured tubes are conveyed through a welding station where a cruciform wing passes between a pair of laser welders which are controlled to effect a continuous seam weld in a V-shaped groove on each side of the wing. After multiple passes through the welding station, all of the tubes are united by welded seam joints. The cruciform wings are welded to central tie bar sections, a handle is welded to one end of the cruciform, and a velocity limiter is welded to the other end to create a structurally rigid control rod capable of withstanding all foreseeable static and dynamic loadings.

The individual tubes though long in length, are rather small in cross-section, e.g., measuring as little as 0.260 inches on each side. Thus, the V-shaped groove between adjacent tubes is extremely small, with an opening width of 30 mils or less. To resolve a joint of such minute lateral dimensions and to faithfully track it while moving at speeds in excess of 60 inches per minute is a formidable task. Moreover, the tracking sensor must control the laser welding beam such that it is both laterally aligned with the groove and focused substantially at the bottom thereof all the while the fixtured tubes are being conveyed through the welding station at a high relative velocity.

It is accordingly an object of the present invention to provide a laser welding system for joining metallic elements along an elongated joint.

A further object is to provide a laser welding system of the above-character, wherein the laser welding beam is controlled to automatically track an elongated joint while moving at a relatively high velocity.

An additional object is to provide a joint tracking laser welding system of the above-character, which is capable of precision welding an elongated joint having relatively small transverse dimensions.

Another object is to provide a precision joint tracking laser welding system of the above-character, which is flexible in operation, insensitive to environmental influences, and convenient to implement.

Other objects of the invention will in part be obvious and in part appear hereinafter.

SUMMARY OF THE INVENTION

In accordance with the present invention, a laser profiler sensing head is mounted to a laser beam focusing head in a position to repeatedly laser scan the profile of an elongated, moving joint at a succession of transverse viewing planes closely in advance of their presentation to a laser welding beam. The profiler head response is processed to generate data defining the joint profile included in each transverse viewing plane. Joint profile data are computer processed in accordance with a joint extraction algorithm pursuant to a tracking schedule particularly designed for the joint to be welded. The computer then determines the location in the profiler field of view of the joint longitudinal centerline for each transverse viewing plane. Location data defining the joint centerline position in terms of a profiler coordinate system are transformed to a corresponding, but offset weld tracking coordinate system comprised of a Z-focusing axis and a Y-cross seam axis lying in a tracking plane transverse to the joint. The transformed location data are then used to laterally control the laser welding beam position and its focus in synchronism with the arrival of the successive viewing planes from which the location data was obtained at the tracking plane. The laser welding beam thus faithfully tracks the joint and is continually focused to maximum intensity at a target in the joint where fusion is to occur.

The invention accordingly comprises the features of construction, combination of elements, and arrangement of parts, all as disclosed in detail below, and the scope of the invention will be indicated in the claims.

For a full understanding of the nature and objects of the present invention, reference may be had to the following Detailed Description taken in conjunction with the accompanying drawings, in which:

FIG. 4 is a block diagram of the data processing hardware utilized in the system controller of FIG. 1;

FIG. 5 is fragmentary sectional of a pair of metallic elements forming the joint to be tracked and welded; and FIGS. 6A, 6B and 6C illustrate representative CRT displays of the profile data generated by the laser profiler of FIG. 1.

Like reference numerals refer to corresponding parts throughout the several views of the drawings.

DETAILED DESCRIPTION

Figure 1:
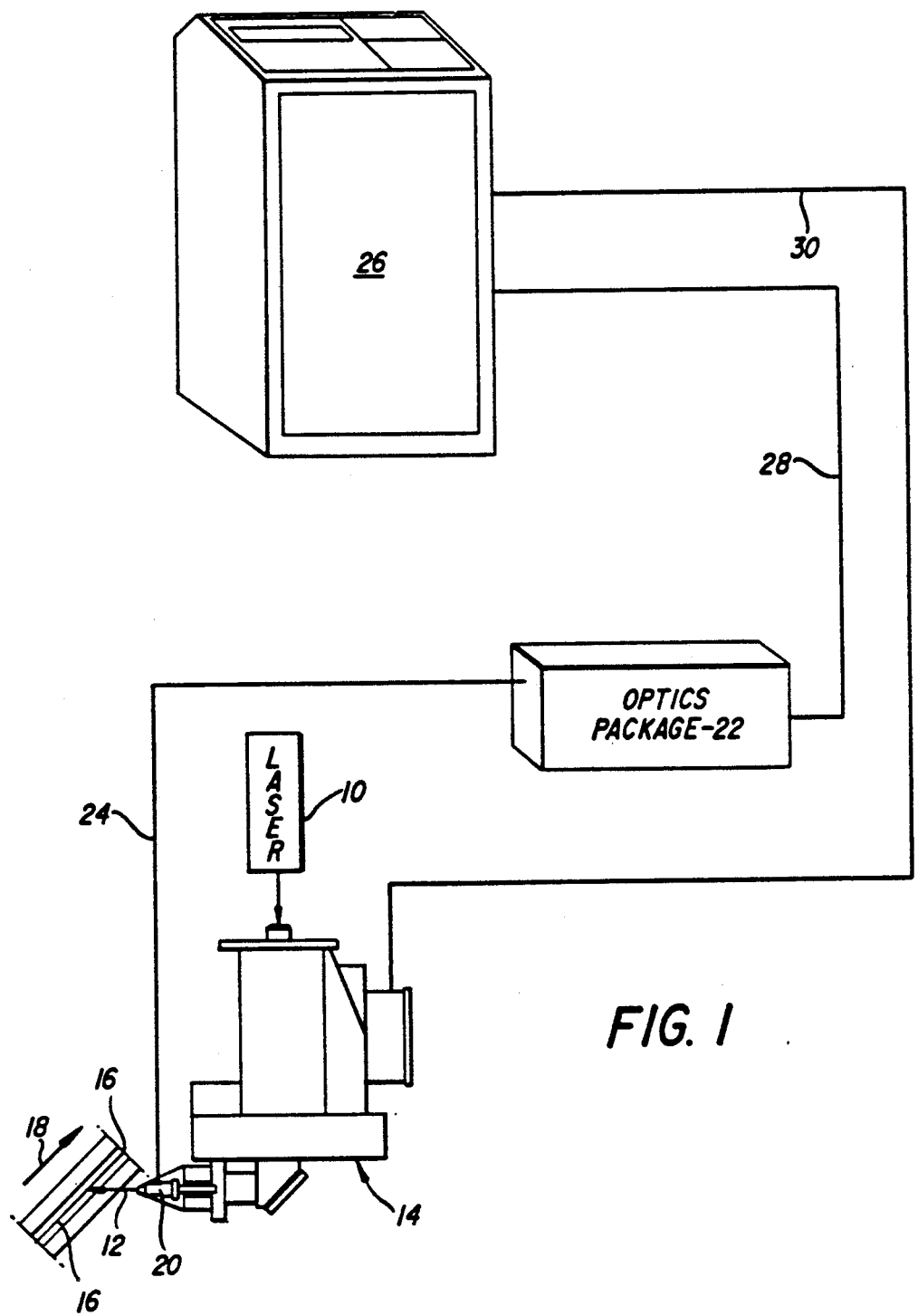
FIG. 1 is a block diagram of a joint tracking system constructed in accordance with the present invention.

The precision joint tracking laser welding system of the present invention, seen generally in FIG. 1, includes an industrial laser 10, such as a Coherent General S51 C02 laser, for generating a laser welding beam 12 which is directed by a beam positioning head, generally indicated at 14, to a focused spot for creating a continuous seam weld of an elongated joint 16 being conveyed therepast in the direction indicated by arrow 18. Mounted to the positioning head is the sensing head 20 of a laser profiler, preferably of the type disclosed in the above-cited U.S. Pat. No. 4,645,917 whose disclosure is specifically incorporated herein by reference. The profiler head is coupled with an optics package 22 via separate input and output coherent fiber optic bundles commonly indicated at 24. The optics package includes, as disclosed in U.S. Pat. No. 4,645,917, a laser and X and Y laser beam scanners operating to sweep the laser beam in a raster scanning fashion. The swept laser beam is directed by the input fiber optic bundle to profiler sensing head 20 for projection onto the surface of joint 16 at angle from vertical in the range of 30°–40°. From a viewpoint normal to the joint surface, diffuse reflected light is picked up by the sensing head and conveyed to the optics package via the output bundle of optic fibers where it is descanned in the Y-sweep direction and directed through an aperture to a photomultiplier tube. As a result, the photomultiplier tube only sees the laser spot during each X-sweep when it traverses a very narrow view stripe oriented in the transverse or cross seam direction. Operation of the optics package components is controlled from a controller 26 over a cable 28. The photomultiplier responses are processed by a microprocessor which notes the interval from the start time of each X-sweep to the time the photomultiplier tube sees the laser spot, and, from this, can readily derive data defining both the locations and relative elevations of a multiplicity of closely spaced points on the joint surface which are aligned with a transverse viewing plane. From this surface point data, the microprocessor generates profile data for each of a succession of closely spaced viewing planes or transverse sections of joint 16 distributed along the length thereof. This profile data is fed to system controller 26 over cable 28. By stationing profiler head 20 to the upstream side of laser welding beam 12, the profiler location data is available to control positioning head 14 via a cable 30 to direct and focus the laser welding beam in a transverse tracking plane in anticipation of the interceptions of the successive transverse viewing planes with the beam tracking plane. The laser, welding beam is thus controlled to track joint 16 as it moves therepast in the direction of arrow 18.

Figure 2:
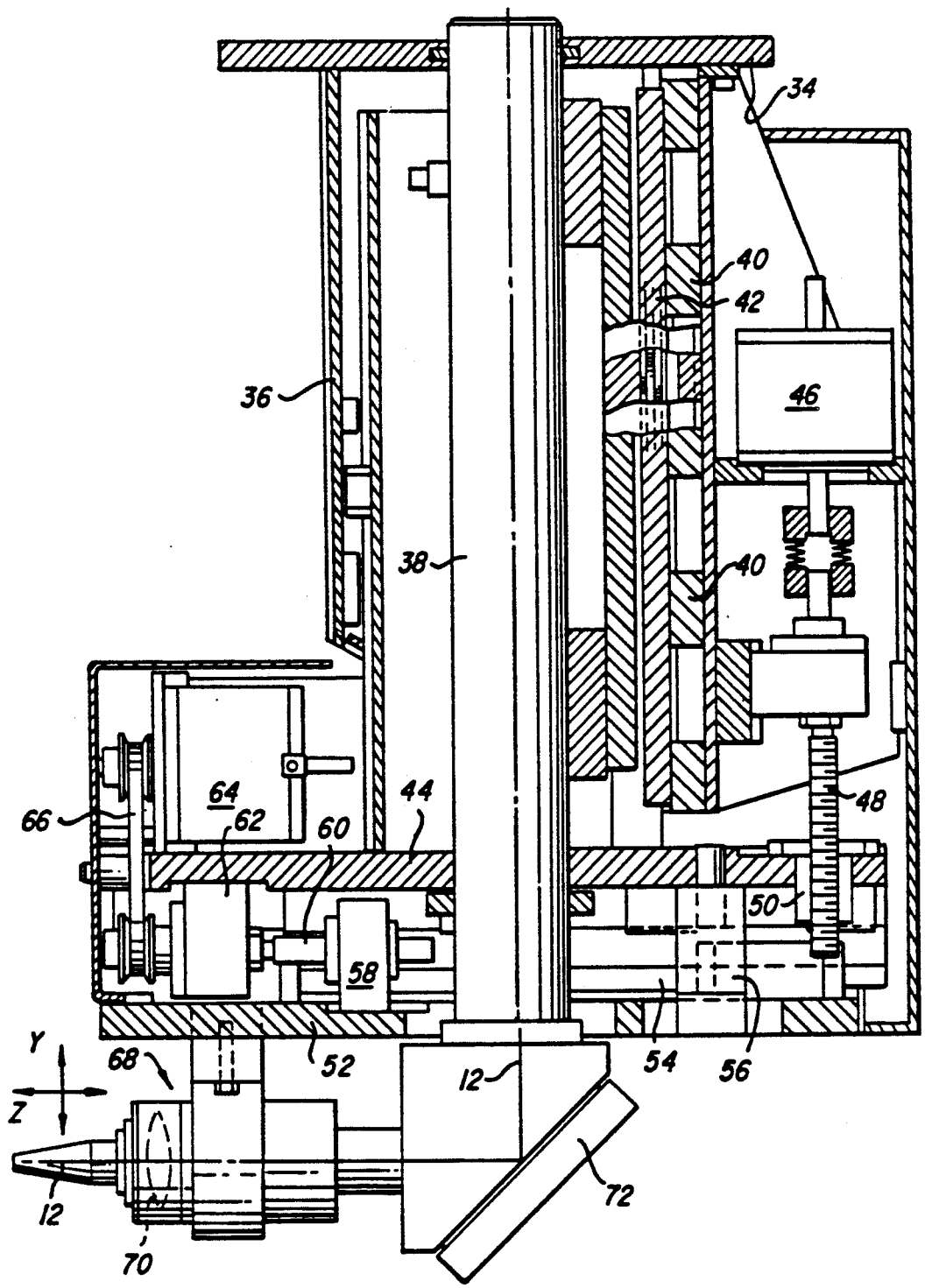
FIG. 2 is a sectional view of the welding beam positioning head utilized in the system of FIG. 1.

Beam positioning head 14, seen in greater detail in FIG. 2, includes a faceplate 34 which is carried by a suitable positioning mechanism (not shown), such as disclosed in the above-cited copending application Ser. No. 250,631. This positioning mechanism is utilized during setup preparatory to welding to nominally align the laser welding beam with the particular joint to be welded and to ensure that the joint is within the field of view of laser profiler head 20, both in terms of cross-seam lateral limits and depth of field limits.

Depending from faceplate 34 is a support column which carries a centrally located laser beam delivery tube 38. Column 36 also carries a pair of laterally spaced sets of vertically spaced ways 40 for captively accepting a corresponding pair of vertically elongated slides 42. A upper horizontal mounting plate 44 is affixed to the lower ends of these slides. Further mounted by the support column is a motor 46 having an output shaft connected to drive a ball screw ,48 which is engaged by a travelling nut 50 affixed to mounting plate 44.

A lower horizontal mounting plate 52 carries a pair of slides, one seen at 54, which are captively engaged in ways 56 depending from upper mounting plate 44. The lower mounting plate also carries a travelling nut 58 which engages a lead screw supported from upper mounting plate 44 by bearings 62. A second motor 64, carried by the upper mounting plate, rotates lead screw 60 via a belt and pulley drive, generally indicated at 66, to produce horizontal movement of the lower mounting plate relative to the upper mounting plate.

Mounted to lower mounting plate 52 is a focusing head 68 in which is carried a focusing lens 70 for laser beam 12 which is projected vertically downward through delivery tube 38 and reflected horizontally through focusing head 68 by a mirror 72 mounted to the lower end of the tube. It is thus seen that selective bidirectional rotation of motor 46 adjusts the vertical position of focusing head 68 and thus moves laser welding beam 12 along a Y axis, i.e., in the transverse or cross seam direction, so as to track the joint. Motor 64 is selectively energized to horizontally position the focusing head along a Z or focusing axis so as to maintain the welding beam focused substantially at the bottom of the joint 16 to be welded.

Figure 3:
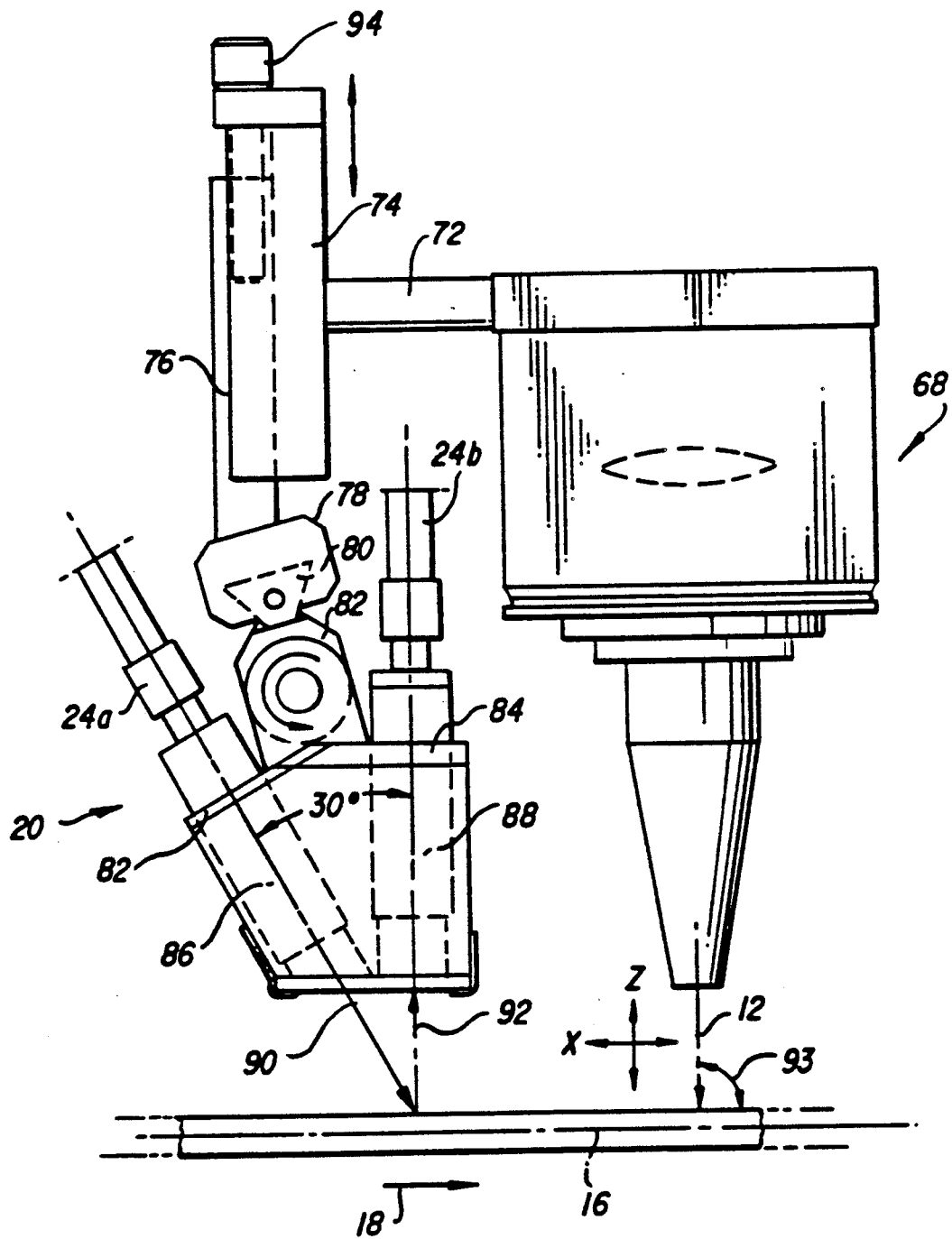
FIG. 3 is a side view of the laser profiler head utilized in the system of FIG. 1.

As seen in FIG. 3, laser profiler head 20 is mounted to one side of focusing head 68- by a bracket 72. The profiler head thus moves with the focusing head. This bracket includes a slide block 74 which captively receives a slide 76 carrying at its illustrated lower end a second slide block 78. Received in this slide block is a wedge shaped slide 80 to which is depended a knuckle joint 82 for adjustably, pivotally mounting a pair of brackets 84 and 82 . Bracket 82 mounts a focusing lens 86 to which the output end of the input optic fiber bundle 24a is coupled. Bracket 84 mounts a collecting lens 88 to which the input end of output optic fiber bundle 24b is coupled. Lens 86 directs a laser sensing or profile probing beam 90 at joint 16 and lens 88 collects the diffuse light reflected from the joint along a path 92 normal to its surface. Brackets 82 and 84 are pivotally adjusted on knuckle joint 82 to set a desired angle between the axes of lenses 86 and 88, e.g., 30°, and also to account for any oblique welding beam push angle 93 to which the beam positioning head may be set. The position of slide 80 in block 78 and the position of slide 76 in slide block 74 are adjusted (via thumb screw ,94) during setup to establish a requisite relationship between the profiler coordinate system and the welding beam tracking coordinate system. That is, the beam positioning motors 46 and 64 are homed to position focusing head 68 at the midpoints of its ranges of Y and Z axes movements so as to establish the origin of the tracking coordinate system at a reference spatial position coincident with the focused spot of the laser welding beam. The profiler head position is then adjusted to align the center of the profiler field of view, which is the origin of the profiler coordinate system, with the X axis of the tracking coordinate position. As seen in FIG. 3, this X axis nominally aligned with the longitudinal centerline of the joint.

Controller 26 includes, as seen in FIG. 4, a joint extraction computer 100 which processes profile data received from the profiler optics package 22 to compute the location of the joint centerline in the profiler field of view for each transverse viewing plane in accordance with a tracking schedule designed to fit the geometry of the particular joint to be welded. The computed joint centerline location defined in coordinates of the profiler coordinate system is fed to a tracking computer 102 for processing by a tracking algorithm. Positioning data in the tracking coordinate system is fed to a CNC controller 104 which, in turn, selectively energizes motors 46, 64 (FIG. 2) to position focusing head 68 in the cross-seam direction along the Y axis and in the focus direction along the Z axis so as to continuously position the welding beam focused spot at a target point in the moving joint for optimum welding.

A tracking schedule includes a series of joint parameters that characterize the geometry of the particular joint and operating parameters that govern the overall system operation. The joint parameters include corner point threshold values used by the joint extraction algorithm to locate from the profile data joint corner points 106 and 108 of the two elongated elements 16a and 16b forming the joint, as indicated in FIG. 5. A corner point function length value defines the distance over which a quasi-slope function is to be implemented to find the joint surfaces 110. A center corner point threshold value is used in conjunction with the above parameter values to find the joint centerline when the elements 16a, 16b are juxtaposed, i.e., no gap. A minimum reflectivity parameter is used as reflectivity threshold to determine the size of any gap, between the elements. A minimum search area size value is used to verify that the profile data contains adequate joint feature data points for locating the joint. FIG. 6A is a CRT display of the profile data for a particular transverse viewing plane showing the joint with no gap or mismatch between the elements 16a and 16b.

The tracking schedule also includes a maximum joint gap value and a gap range value. If the gap is found to exceed the maximum value, the joint extraction algorithm then tracks the longitudinal distance along the joint that this gap condition exists. If the joint gap exceeds the maximum value over a longitudinal distance exceeding the range value, laser welding would typically be halted. FIG. 6C illustrates a CRT display of profile data indicating a joint gap.

In addition to the joint gap problem, the elements 16a and 16b may also be mismatched, as indicated in FIG. 5. This condition is recognized in the joint extraction algorithm from the different elevations of corner points 106 and 108. Thus, the tracking schedule further includes maximum joint mismatch and mismatch range values. If the mismatch exceeds the maximum value over a longitudinal distance exceeding the range value, welding is halted. FIG. 6B illustrates, a CRT display of profile data indicating a joint mismatch.

The tracking schedule may also include bordering parameters used to define a smaller search window within the larger profiler field of view in which the joint extraction algorithm looks for joint feature data points pursuant to the above-described tracking schedule joint parameters. These bordering parameters are used when it is desirable to ignore spurious profile data from the marginal portions of the field of view that may confuse the joint extraction algorithm. Such spurious profile data may originate from element features beyond the joint, obstructions such as clamping structure, or the field of view margins being slightly out of focus.

Another parameter of the tracking schedule used by the joint extraction algorithm is a lost joint range value. This parameter specifies the longitudinal distance along the joint over which a lapse in profile data adequate to locate the joint will be tolerated. This allows the joint extraction algorithm to accommodate normal lapses in good profile data due to spatter, smoke and other expected laser welding conditions. If the lost joint range parameter is exceeded, a welding halt would typically be signalled.

The joint centerline location computed by the joint extraction algorithm in computer 100 is supplied to tracking computer 102 in coordinates of the profiler coordinate system. However, CNC controller 104 operates on the basis of the tracking coordinate system established during setup focusing head 68 was located by tracking motors 64,46 its home or midpoint position of the Y and Z axes range of motions. It will be appreciated that during a seam welding operation, the focusing head is tracking the joint and is only transiently in its home position. Thus, the origins of the profiler and tracking coordinate systems are in longitudinal alignment only on a transient basis as well. Consequently, tracking computer 102, in executing the tracking algorithm, must transform the joint centerline location calculated by computer 100 from the profiler coordinate system to the tracking coordinate system. This transformation involves calculating both the offset of the current focusing head welding position from its home position and the offset of the computed joint centerline from current focusing head welding position. In addition, if the focusing head is set at an oblique push angle 93 (FIG. 3), this system transformation requires that the profiler coordinate system be rotated in space to align its Y and Z axes with the corresponding axes of the tracking coordinate system.

As indicated in FIG. 4, certain parameters of the tracking schedule are utilized by the tracking algorithm executed by computer 102. These include lateral or Y axis and focus or Z axis offset values. Depending on the particular joint geometry to which the tracking schedule is designed, the joint centerline at the bottom of the V-shaped groove of the joint calculated by computer 100 may not be the optimum target point location for the welding beam focal point. If not, the tracking schedule would specify the offset values for targeting the beam focal point at the optimum welding location relative to the computed joint centerline. Additional tracking schedule parameters used by the tracking algorithm are tracking sensitivity values, a tracking tolerance value, and an out of tolerance range value. The tracking sensitivity values control the responsiveness of the tracking algorithm to computed positional differences or errors between the actual position of the welding beam focal point and the target point position. A low sensitivity value renders the tracking motion smooth, but system response may then be too sluggish. A high sensitivity value causes the beam positioning head 14 to respond quickly to changes in the computed joint centerline data, but may be too responsive to erroneous data. The tracking tolerance values define the limits of acceptable positional errors between the actual beam focal point and the target point. The out of tolerance range which specifies the maximum longitudinal distance along the joint that an out of tolerance condition will be tolerated before signalling an operator that the system is not properly tracking the joint.

As further indicated in FIG. 4, the tracking algorithm also uses machine constants values in calculating the tracking signals fed to CNC controller 104. These parameters, which typically remain fixed regardless of the tracking schedule being run, include the distance D separating profiler beam 92 from welding beam 12 and the rate at which the joint 16 is being conveyed in the direction of arrow 18 (FIG. 3). From these values, the tracking algorithm can compute the time of intercept of each profiler viewing plane with the tracking plane. That is, the tracking algorithm computes from the distance D and the joint velocity the point in time when each computed joint centerline data set must be used in positioning the welding beam so as to properly track the joint. Another machine constant is the value of any push angle 93 which the tracking algorithm needs to accurately align the Y and Z axes of the profiler and tracking coordinate systems, as explained above.

Other machine constants are limit values of the slew rates of the tracking motors 64,46, limit values establishing the maximum offset values that can be specified in the tracking schedule, the resolutions of computer joint centerline location data in the profiler coordinate system, and the resolutions of the tracking motors.

From the foregoing description, it is seen the objects set forth above, including those made apparent hereinabove, are efficiently attained, and, since certain changes may be made in the construction set forth, it is intended that the Detailed Description be taken as illustrative and not in a limiting sense.

Having described the invention, what is claimed as new and desired to secure by Letters Patent is:

1. A joint tracking welding system comprising, in combination:
   A. a laser for generating a laser welding beam;
   B. a focusing head for focusing said beam to a focal point located in an elongated joint while in linear motion relative thereto;
   C. a positioning head mounting said focusing head for, controlled movement relative to the joint along a focusing Z axis and lateral positioning Y axis;
   D. a laser profiler mounted to the upstream side of said focusing head with respect to the joint relative motion, said profiler generating profile data defining the joint profile at successive transverse viewing planes in advance of their presentations to said welding beam;
   E. means for processing said profile data in accordance with a selected tracking schedule to locate the joint centerline within a field of view of said profiler lying within each said viewing plane and to generate positioning signals for continuously adjusting the position of said positioning head along said Y and Z axes tending to maintain the focal point of said welding beam located in the joint at a predetermined target point relative to the joint centerline.

2. The system defined in claim 1, wherein said processing means includes a joint extraction computer and a joint tracking computer.

3. The system defined in claim 2, wherein said joint extraction computer includes means for calculating from said profile data joint centerline location data in a profiler coordinate system, and said joint tracking computer includes means for transforming said centerline location data to a tracking coordinate system comprised of said Y and Z axes of said positioning head.

4. The system defined in claim 3, wherein said profiler is mounted to said focusing head a predetermined distance upstream from said welding beam, and said joint tracking computer includes means for calculating from said predetermined distance and the linear velocity of the joint motion the interceptions of said successive viewing planes with a tracking plane containing said positioning head Y and Z axes.

5. The system defined in claim 4, wherein said joint extraction computer further includes means for processing said profile data to determine when any gap between elongated elements forming the joint exceeds a size limit parameter over a first predetermined longitudinal length parameter of the joint, said size and first length parameters being defined in said tracking schedule.

6. The system defined in claim 5, wherein said joint extraction computer further includes means for processing said profile data to determine when any mismatch between the elements exceeds a dimension parameter over a second predetermined longitudinal length parameter of the joint, said dimension and second length parameters being defined in said tracking schedule.

7. The system defined in claim 6, wherein said positioning head includes a support column held stationary during a joint welding operation, a first support plate slidingly mounted by said column for movement along said Y axis, a second support plate slidingly mounted by said first support plate for movement along said Z axis, a first motor mounted by said support column propelling said first support plate in Y axis positioning movements, and a second motor mounted by said first support plate for propelling said second support plate through Z axis position movements, said focusing head being mounted by said second support plate.

8. The system defined in claim 7, wherein said positioning head further includes a welding beam delivery tube extending centrally through said support column and a mirror mounted to an end of said delivery tube for reflecting said laser welding beam projected along said Y axis through said delivery tube along a path aligned with said Z axis to said focusing head.

9. The system defined in claim 8, which further includes a CNC controller for selectively energizing said first and second motors in response to said positioning signals from said joint tracking computer, said controller energizing said motors to position said focusing head at the midpoints of the ranges of movements along said Y and Z axes to thereby establish a spatial reference position for the origin of said tracking coordinate system preparatory to a welding operation.

* * * * *